March 16, 1954     A. C. RUGE     2,672,048
TEMPERATURE COMPENSATED STRAIN GAUGE
Filed Feb. 14, 1952
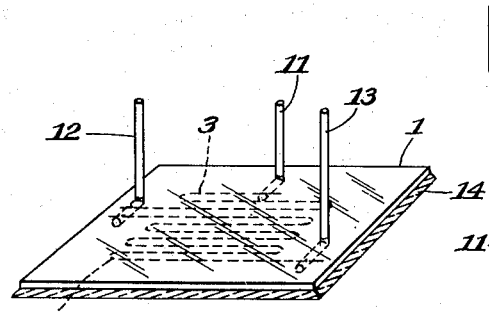
FIG. 1
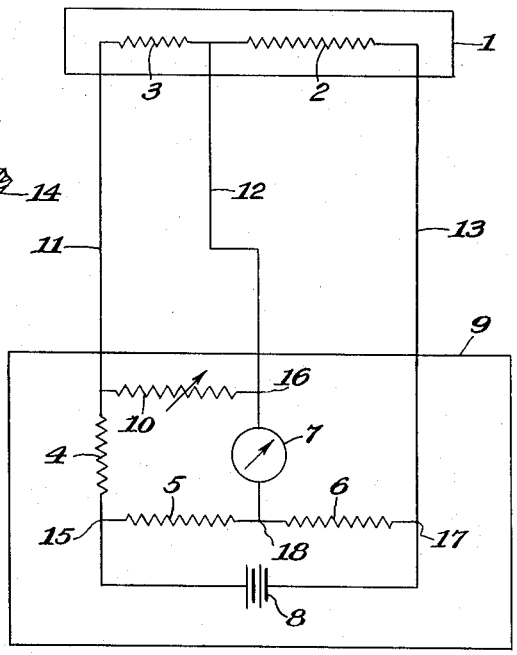
FIG. 2
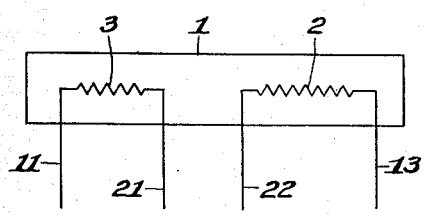
FIG. 3
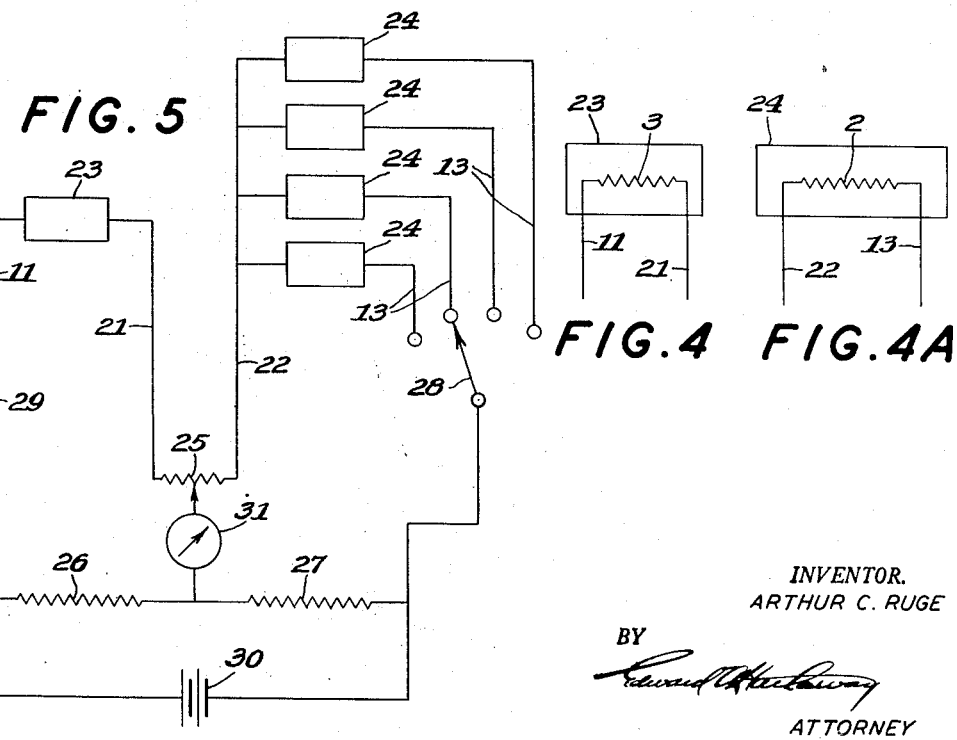
FIG. 4    FIG. 4A
FIG. 5
INVENTOR.
ARTHUR C. RUGE
BY
ATTORNEY Patented Mar. 16, 1954

2,672,048

UNITED STATES PATENT OFFICE 2,672,048

TEMPERATURE COMPENSATED STRAIN GAUGE

Arthur C. Ruge, Cambridge, Mass., assignor to Baldwin-Lima-Hamilton Corporation, a corporation of Pennsylvania Application February 14, 1952, Serial No. 271,545

14 Claims. (Cl. 73—88.5)

This invention relates to temperature compensated strain gages of the electrically resistive type particularly for high temperature applications.

A number of forms of temperature-compensated resistive type strain gages have been proposed and used with some success. However, all of these forms have certain limitations which are well known. In fact, a great deal of effort on the part of various investigators has gone into attempts to avoid or minimize these limitations, heretofore with only indifferent improvement resulting.

The oldest and most commonly used method employs a dummy or compensating gage identical to the active gage, both gages being subjected to identical conditions in every respect except that the dummy gage is free of strain due to stress. This method is still the most precise when conditions permit its use. The limitation of this method is that it is sometimes impractical to mount a dummy gage so as to be free of stress-induced strain; also, if the temperature is varying rather rapidly during the test it may be practically impossible to keep the dummy gage at the same temperature as the active gage, which can result in very large errors. Unless testing conditions are rather ideal this is a dangerous method to employ because the investigator may not be aware of large temperature differences existing and therefore may draw false conclusions from his readings.

Experimenters sometimes resort to an even more difficult technique; namely, that of independently measuring the temperature and reading the strain gage at each point in the test, later correcting the strain gage readings to take account of the known effect of temperature upon the strain gage. This can hardly be termed a practical method although it has been used as a desperation measure where the dummy gage method could not be employed.

A so-called "self-compensated" strain gage has also been used employing two compensating filaments connected in series or parallel in accordance with my Patent 2,350,972. This is a two-terminal type of strain gage which is so adjusted that its response to temperature is made negligible. This gage, being self-contained, avoids the limitations of the dummy gage principle and is especially useful where rapidly varying temperatures are encountered. However, gages of this type are subject to severe limitations in choice of materials, being presently limited to wires of the "Constantan" type or a combination of "Constantan" with a very limited choice of other wires. "Constantan" wire is a copper-nickel alloy. The result is that this type of gage is restricted to use over a limited temperature range, the upper limit being about 300° to 350° F. Above that temperature, the temperature coefficient of the wire used no longer remains within acceptable limits. Also, prolonged exposure to elevated temperatures causes the wire to change metallurgically, rendering it unfit for use as a static strain gage except for very short periods of time. Another factor in high-temperature application is corrosion which also affects this type of wire rather rapidly causing it to be unsuitable for static strain measurements.

There are, however, strain sensitive materials which are free of the above objections. They not only withstand high temperatures very well but also withstand the corrosive attack to which high-temperature gages are frequently subjected, and they also have other desirable characteristics such as high specific resistance and good strain sensitivity. Nevertheless, these materials are not usuable in the above described self-compensated gage because there is no known suitable material which can be combined with them to achieve the self compensation that is necessary. For instance, one such material known as "Nichrome V" is a nickel chromium alloy consisting approximately of 80% nickel and 20% chromium. Some samples of this material which I have tested show an equivalent strain change due to temperature of about 27 microns/in./°F. It happens that there is no material available which can be combined with this wire to provide a self-compensated gage in accordance with my Patent No. 2,350,972 to operate at elevated temperatures successfully. While this material can be used with the dummy gage principle successfully, its large temperature coefficient requires that the dummy gage be held at almost precisely the same temperature as the active gage if reasonably accurate results are to be obtained. This is manifestly impossible in the case of such applications as measurement of strains on gas turbine blades or jet engine tail pipes where the temperature of the strain gage is rapidly changing.

My present invention makes it possible to successfully employ a material such as "Nichrome V" wire in a compensated strain gage even over a wide range of temperature where the temperature is varying rapidly during the course of measurement. In order to fully set forth the advantages of my new compensated strain gage I shall first explain the operation of my earlier so-called "self-compensated" gages to which there is a superficial resemblance.

To eliminate lag in temperature compensation as well as the effects of acceleration forces on dummy gages I have heretofore proposed in my Patent 2,350,972, another type of temperature compensated gage employing two filaments connected in series or parallel, both of which are cemented to the member under test and thus both subject to the strain to be measured and to identical temperature, the two filaments being made of different materials and of different but opposite thermal coefficients of electrical resistance whereby the overall electrical resistance of the gage is substantially unaffected by temperature changes. It will be understood that by "opposite" thermal coefficients I mean that the materials for any selected range of their operation will have thermal coefficients of opposite algebraic sign. This type of compensated strain gage has proved to be very effective in making strain measurements where rapid temperature changes are encountered. However, it has the limitation that the materials must not only have different and opposite thermal coefficients but must also be suitable for performing a strain gage function. Although there is a wide choice of materials exhibiting a positive temperature coefficient of resistance and suitable for high temperature applications, the choice of materials having a negative temperature coefficient of resistance is limited and no suitable materials are presently known to me having a negative coefficient large enough to compensate for the large changes of resistance arising from the materials of positive coefficient under high temperature applications.

Still further effort to provide a suitable form of temperature compensated gage is disclosed in my Patent 2,390,038 which also involves the use of two filaments, one of which is a strain sensitive filament and the other is a temperature compensating filament of relatively large size in the nature of an intermediate lead wire located between the strain filament and a large external lead wire, the two filaments having opposite thermal coefficients of electrical resistance. This type is subject to the same limitations as the previously described double filament gage.

One object of my invention is to provide an improved temperature compensated strain gage whose principles of construction and operation are such that materials for a strain filament and a temperature compensating filament may be selected with greater freedom from physical and functional limitations than has heretofore existed, especially for high temperature applications.

Another object is to provide an improved temperature compensated strain gage of the electrical resistance type entirely bonded to the member under test and which is especially useful for high temperature applications while at the same time having a high degree of strain sensitivity, accuracy, and stability for either static or dynamic strain measurements.

Still another object of my invention is to provide an improved temperature compensated strain gage which combines the advantages of existing types of low temperature compensated gages but avoids the disadvantages inherent in them, this combination of advantages and avoidance of disadvantages being the result of a new functional relationship of the characteristics of the filament materials and the manner in which these filaments are combined in a circuit.

A further object is to provide an improved temperature compensating strain gage apparatus in which the temperature compensating properties can be adjusted or modified externally of the gage itself.

In accomplishing the foregoing and other objects it is now possible to employ strain measuring and temperature compensating filament materials whose temperature coefficients of resistance are not only of the same algebraic sign as was the case with dummy gages but the thermal coefficient of resistance and the strain sensitivity of the compensating filament material may be widely different in magnitude from those of the strain filament material instead of being identical as in dummy gages. Also, the compensating filament can be bonded to the member under test to obtain the advantage of eliminating acceleration effects and temperature lag or difference as was possible with the prior dummy gage method. As a result of fundamental differences in principles between my present and past inventions it will be pointed out that in one specific illustration of my present invention the compensating filament material has a thermal coefficient of resistance approximately 50 times greater than that of the strain gage filament.

As compared with my self-compensated gages of Patents 2,350,972, and 2,390,038, my present invention makes it possible to retain all of the functional advantages of such gages and in addition provides a greatly extended choice of materials. As a result of such greater flexibility, it is now possible to extend the range of static measurement to temperatures far above those possible with the earlier construction with its limited choice of materials. This greater flexibility of design is also advantageous in connection with gages intended for lower temperature work since the gage designer is relieved of the problem of finding suitable materials having temperature coefficients of resistance of opposite signs.

Notwithstanding a seeming similarity in appearance between certain of the prior temperature compensated gages and my present invention, this appearance is of a superficial nature as will be more apparent to those skilled in the art from the following description of the accompanying drawings in which:

Fig. 1 is a perspective of one form of my present invention;

Fig. 2 is a measuring circuit in which the gage is arranged in a new cooperative manner;

Fig. 3 diagrammatically illustrates the manner in which the two filaments of my gage may be separated from each other while still performing their cooperative temperature compensating functions;

Figs. 4 and 4a are views similar to Fig. 3 but merely showing the two filaments mounted on their own supporting membranes; and Fig. 5 is a combined measuring and switching circuit for multiple gage installations to show how each gage in a group of gages may have its individual temperature compensation adjusted.

In order to explain the construction and functioning of my present invention, I shall use as an example a strain gage intended primarily for the measurement of static strains at elevated temperatures, such as 500° to 1,000° F. By employing a specific example the principle is more easily explained, but it will be readily understood that the invention is by no means limited to this particular temperature range.

In Figs. 1 and 2 are illustrated schematically the construction of my new temperature-compensated gage. The gage is preferably of the so-called bonded wire type, although its principles may be employed in unbonded gages as well, and comprises two strain sensitive filaments 2 and 3 which for purposes of illustration may be arranged as shown in Fig. 1 and suitably connected to lead wires 11, 12 and 13, preferably by welding when used for high-temperature work. Filaments 2 and 3 are bonded into a carrier member 1 which in turn is applied to the surface under test by means of a suitable cement 14 whose usual and well known function is to transmit strains from the surface under test to the strain gage. In a high-temperature gage, both the carrier member 1 and the attaching cement 14 are preferably of ceramic type such as "Quigley" Strain Gage cement, and "Sauereisen" cement, although fusible material such as vitreous enamel may be employed provided the melting point of the fusible material is considerably above the maximum operating point during strain measurement. For lower temperature applications the cement may be of the nitrocellulose type or of "Bakelite," for examples.

Filaments 2 and 3 are made of different materials and may have different sensitivities to strain, but it is necessary that their temperature coefficients of resistance as measured when the strain gage is attached to the test surface be of the same algebraic sign. This, it will be seen, is in marked contrast to the dual filament gage disclosed in my Patent 2,350,972, despite a superficial resemblance in appearance. Fig. 2, which shows the schematic wiring diagram of a measuring circuit suitable for use with my new gage will serve to bring out the features which make the new gage distinctive from both that of Patent 2,344,642 and that of Patent 2,350,972, to both of which there is also a superficial resemblance since, as stated above, the new gage combines certain advantages of both while eliminating certain disadvantages thereof.

Identical parts in Figs. 1 and 2 are numbered identically for convenience in following the disclosure. It is seen from Fig. 2 that filaments 2 and 3 have common junction which is brought out to the measuring circuit 9 by lead 12. The remaining terminals of 2 and 3 are brought out by leads 13 and 11 respectively. In the case of a high-temperature strain gage, filament 2 may be made of "Nichrome V" wire for example and might have a resistance of 500 ohms. Filament 3 might be made of platinum wire and having a resistance of the order of 10 ohms. It is to be noted that both of these filaments possess temperature coefficients of resistance having the same algebraic sign, namely positive in this case, the coefficient for platinum being about 50 times greater than that of "Nichrome" wire. Both filament materials also possess a sensitivity to strain, although for the purposes of this invention only one strain measuring filament, say 2, is required to have strain sensitivity. In the case of the materials used in this illustration, the strain sensitivity of the platinum wire would be between two and three times that of the "Nichrome" wire.

The term "temperature coefficient of resistance" as used above is defined to be the temperature coefficient of resistance of the filament when bonded to the particular material under test. This temperature coefficient is generally determined experimentally and depends upon the temperature coefficient of resistance of the free or unstressed filament, the difference in the thermal coefficients of expansion of the filament and the material on which it is mounted, and the strain sensitivity of the filament material. Thus, a wire filament such as "Nichrome V" will exhibit a markedly different temperature coefficient of resistance when mounted on steel as compared with its coefficient when mounted on "dural." The strain gage user is concerned only with the temperature coefficient of the filament when bonded to the material under test. This definition is therefore used throughout the disclosure.

Considering now the measuring circuit of Fig. 2, it will be seen that with filaments 2 and 3 connected into the circuits between points 15, 16, 17, the circuit comprises a Wheatstone bridge having power input corners 15, 17, and detector corners 16, 18. Filament 2 forms one arm of the bridge while filament 3 in series with a resistance element 4 forms an adjacent arm. The remaining two arms of the bridge are made up of suitable impedance elements 5 and 6. The source of power 8 and a detector element 7 make it possible to determine the degree of unbalance of the bridge in the conventional manner. For the sake of simplicity, it may be imagined that initially impedance elements 5 and 6 are made exactly equal and that at a given temperature the resistance of strain measuring element 2 is exactly equal to the sum of the resistances of elements 3 and 4, so that the bridge is perfectly balanced. Now it may be seen that if the resistances of elements 2 and 3 are so chosen that they are inversely proportional to the temperature coefficient of resistance of the two materials, as measured when the gage 1 is mounted on the test surface, then a change in temperature of the material of the test surface will produce the same resistance change in both elements 2 and 3 and therefore the bridge will remain balanced despite the temperature change and despite the fact that both elements 2 and 3 may have a very substantial temperature coefficient taken by themselves. If, on the other hand, a strain is now applied to the test surfface, both elements 2 and 3 will change resistance in response to the strain and, if the two materials have been chosen properly, as outlined herein, the change in their resistances as a result of the applied strain will be different, thus causing an unbalance of the bridge circuit to occur in response to strain.

In the case of the high-temperature gage example being used, it will be seen that element 2 which is made of 500 ohms of "Nichrome V" wire will change in resistance a great deal more in response to strain than will element 3 which is made of about 10 ohms of platinum wire, despite the fact that the platinum wire happens to be more sensitive to strain than the "Nichrome V" wire. Thus it will be seen that it is only necessary that the two elements comprising the gage have to be selected to satisfy two requirements (1) they must compensate each other against changes of temperature of the medium to which the gage is bonded and (2) they must produce in the measuring circuit a response to strain applied to the medium on which the gage is bonded.

In order to meet these requirements, it is necessary that the two elements 2 and 3 have temperature coefficients with the same algebraic sign and it is necessary that at least one of the elements be responsive to strain. No other restrictions need be placed upon the materials comprising elements 2 and 3, it being merely a matter of selecting their resistances relative to each other so as to secure the desired temperature compensation when the gage is connected in to the measuring circuit. It will, of course, be understood that the change of resistance of filament 3 in response to change of strain in the member under test does not affect the accuracy of the strain filament 2 but merely reduces the sensitivity of the gage, this reduction being of negligible consequence.

To continue with the numerical example used to illustrate the possibilities of my new gage, we assume in Fig. 2 that element 2 is made of "Nichrome V" wire having a resistance of 500 ohms, element 3 is made of platinum wire having a resistance of 10 ohms, element 4 is a fixed resistance of 490 ohms, and elements 5 and 6 are any two equal impedances so that the bridge is initially perfectly balanced. We further assume that the "Nichrome V" wire has a temperature coefficient of $+.050$ times $10^{-3}$ ohms/ohm °F. and a gage factor of $+2$. The platinum wire is assumed to have a temperature coefficient of $+2.5$ times $10^{-3}$ ohms/ohm/°F. and a gage factor of $+5$.

First we consider the effect of a change of temperature on the balance of the bridge. It is seen that the "Nichrome V" element 2 will change 500 times .050 times $10^{-3}$ or 25 times $10^{-3}$ ohms/°F., increasing resistance with increasing temperature. The platinum element 3 will change 10 times 2.5 times $10^{-3}$ or 25 times $10^{-3}$ ohms/°F., also increasing with increasing temperature. Therefore it is seen that a change of temperature will change the resistance of the adjacent bridge arms equally and the bridge balance will be unaffected thereby. The design chosen therefore meets my requirement for a compensated strain gage; namely, that the strain indicated by the measuring instrument is unaffected by change of temperature of the gage.

Now we consider the effect of strain. Assume that a tension strain of 1,000 microns/in. is applied to both elements 2 and 3. The Nichrome element 2 will increase in resistance 2 times 1/1,000 times 500 or 1.00 ohm. The platinum element 3 will increase in resistance 5 times 1/1,000 times 10 or .05 ohm. Since both adjacent arms will increase resistance, the bridge will be unbalanced by the difference; i. e., the sensitivity of the combination of elements 2 and 3 will be 95% of the sensitivity of element 2 used alone. It is therefore seen that very little attention need be paid to the strain sensitivity of the materials so long as they satisfy the temperature coefficient requirements. It is seen that the most efficient design employs compensating element 3 having a very high temperature coefficient of resistance and a low strain sensitivity or ideally a strain sensitivity opposite in sign to that of element 2. It is further seen that the choice of materials is not at all critical—for example, even had we chosen a material for element 3 having one-half the temperature coefficient of resistance of platinum and twice its gage factor, the sensitivity of the strain gage combination 2, 3 will still be 80% of the sensitivity of element 2 alone, which is quite adequate.

While I have described this application to Fig. 2 as a symmetrical bridge, it is readily seen that arms 2 and 3, 4 need not necessarily be equal in resistance. The requirement for the two elements 2 and 3 is as stated above: "They must produce in the measuring circuit a response to strain applied to the medium on which the gage is bonded." And in addition "They must compensate each other against changes of temperature of the medium to which the gage is bonded." Thus, in the numerical example above we could have made element 3 of 5 ohms of platinum wire, element 4 of 245 ohms of fixed resistance, leaving element 2 as 500 ohms of "Nichrome V." The remaining arms of the bridge 5 and 6 would then be chosen so that the bridge is initially balanced. Now if we go through the same analysis as in the numerical example above we will find that the percentage change in arm 3, 4 will be the same as the percentage change in arm 2 when the temperature is changed and therefore the bridge will remain in a state of balance. It is therefore seen that the temperature compensating properties of this gage are inextricably linked with the characteristics of the external part of the bridge circuit. The general case can then be stated that if the arms containing elements 2 and 3 are not equal, then the filaments 2 and 3 must be so chosen that their resistances are proportioned so as to be substantially inversely proportional to the products of their respective thermal coefficients of resistance and the total resistances of their respective bridge arms. While normally the designer would choose to make arms 2 and 3, 4 equal for simplicity, he is by no means restricted to this arrangement. In this specific case, the inverse proportion of the total resistances is 1 to 1 and hence the only requirement to be met is that the resistances of filaments 2 and 3 must be substantially inversely proportional to their thermal coefficients of resistance, it being understood of course that the thermal coefficients of resistance of the filaments are of the same sign but differ in magnitude.

By further following the same line of reasoning it may be seen from Fig. 2 that this new gage has the unique feature that its temperature compensating properties can be adjusted or modified in the external measuring circuit. This is a great advantage since the temperature response of such a gage is considerably affected by the temperature coefficient of expansion of the material upon which the gage is mounted, and this expansion coefficient may not be known precisely in advance. Also, there will always be some scatter in the temperature response of a group of gages, and it is advantageous to be able to adjust the temperature response externally. That this may be done is understood if we consider what would happen if we choose a different value for resistance 4 in Fig. 2. It was assumed above that elements 2, 3, and 4 were all so chosen that the bridge circuit would remain balanced during a temperature change of the material on which gage 1 is mounted. If now we increased the resistance of element 4 it may be seen that detector 7 would show unbalance upon a change of temperature. If, instead, element 4 is decreased, detector 7 would show unbalance in the opposite direction upon the same change of temperature. Thus it is clear that I have provided a means for varying the degree of compensation by varying the amount of resistance 4 placed in series with element 3 to form an arm of the bridge. Another way to achieve the same result is to employ a shunt 10 across element 3. Or, a combination of the two can be used if desired.

In most applications, such adjustment would be unnecessary because the gage 1 would be so proportioned that sufficiently close results would be obtained employing a fixed value for element 4 and a fixed value for shunt 10 if a shunt is used. These fixed values can be determined in advance from knowledge of the characteristics of filaments 2 and 3 and the temperature coefficient of expansion of the material on which the gage is to be mounted. If results of extreme accuracy are required, however, it would only be necessary to start with the estimated proper value for element 4 and shunt 10 (if used) and take observations of the bridge unbalance at two different temperatures and identical stress-induced strain conditions. Knowing the characteristics of filament 3 the adjustment for elements 4 and/or 10 may be readily calculated so as to substantially eliminate the effect of temperature upon the observation, or a process of trial and error will suffice.

Although I have described my invention as applied to a strain gage in which both filaments are contained in one unit, I wish to point out that the gage need not be so constructed. In some instances, for example, it is desirable to insert a bridge balancing device such as a potentiometer between elements 2 and 3 of Fig. 2. To do this, the element may be arranged as shown in Fig. 3 in which elements 2 and 3 are brought out to the measuring circuit independently by four lead wires 11, 13, 21, 22. Alternatively, instead of making the gage as a self-contained unit 1 in Fig. 3, I can just as well make it into two separate gage elements 23 and 24 as illustrated in Figs. 4 and 4a bringing out the connections to the measuring circuit through independent lead wires 11, 13, 21, 22. This latter arrangement of separate gage elements for the two filaments has the advantage that in multiple gage installations where a group of gages are to measure strain in a region of substantially uniform temperature I can employ a single element 23 as the compensator for a multiplicity of elements 24, thus effecting considerable economy and simplification of wiring.

An example of such an arrangement is shown in Fig. 5 where multiplicity of gages 24 and a single compensating gage 23 are connected into a bridge circuit similar to that of Fig. 2 except that the two elements 23 and 24 are brought into balancing means 25 by independent leads 21, 22. The elements 23 and 24 are detailed in Figs. 4 and 4a and bear the same part numbers as there shown. Switching means 28 serves to selectively connect the several elements 24 into the measuring circuit. As in all Wheatstone bridge circuits, power means 30 and detecting means 31 may be interchanged. Also, element 27 may be interchanged with elements 23 and 29 taken in series.

From the above disclosure it may be seen that the principle of my invention is not at all restricted to high temperature gages, but is applicable to gages for service over any temperature range. It will also be seen that I have combined the advantages of the prior compensating principles while at the same time eliminating the difficulties of time lag and sensitivity to acceleration of such prior devices and eliminating the necessity for having the two filaments of the prior bonded type gages possess opposite thermal coefficients of electrical resistance. As a result of my improved compensating strain gage and circuit it is possible to obtain the solution of strain measuring problems under variable temperature conditions, especially in the high temperature range, where no adequate solution has heretofore existed. Specifically, in the case of high temperature strain measurements as are needed in the field of gas turbine and jet engine research there has heretofore been no means available for the measurement of static strains under varying temperature conditions, despite the fact that many investigators have devoted intensive effort to this problem for a number of years.

It will, of course, be understood that various changes in details of construction and arrangement of parts may be made by those skilled in the art without departing from the spirit of the invention as set forth in the appended claims.

I claim:

1. A temperature compensated strain gage of the electrical resistance type adapted to be attached to a member under test, comprising an electrically conductive filament resistively responsive to strain applied to it, a second electrically conductive filament, both of said filaments being subject to substantially the same temperature and the materials of the two filaments having thermal coefficients of resistance of the same algebraic sign but differing in magnitude, and a bridge circuit having adjacent arms in which said filaments are respectively disposed, the resistances of said filaments being so proportioned that upon a change of temperature applied to the gage the unbalance of the bridge circuit is responsive to strain applied to the strain responsive filaments substantially independent of its temperature variations.

2. The combination set forth in claim 1 further characterized in that the resistances of the filaments are proportioned so as to be substantially inversely proportional to the products of their respective thermal coefficients of resistance and the total resistances of their respective bridge arms, whereby the unbalance of the bridge circuit is responsive to strain applied to the gage substantially independent of its temperature variations.

3. The combination set forth in claim 1 further characterized by the provision of means for subjecting the second filament to substantially the same strain as the strain responsive filament.

4. The combination set forth in claim 1 further characterized in that the two filaments are adhesively bonded throughout their effective length to said member under test whereby strains of said member at the point of gage attachment are transmitted to the filaments to cause the latter to extend or contract in following fully the strains of said member and at the same time to follow the temperature of said member at the point of attachment.

5. The combination set forth in claim 4 further characterized in that the two filaments are connected together in series with two leads connected to the remote ends of the filaments and a third lead is connected at the junction of the two filaments.

6. The combination set forth in claim 1 further characterized in that the two filaments are electrically isolated from each other and leads are provided for making external electrical connections to both ends of both filaments.

7. The combination set forth in claim 1 further characterized in that the strain gage is a unitary structure to which the filaments are bonded and which is adapted to be in turn bonded to the surface of the member under test.

8. The combination set forth in claim 1 further characterized in that the strain gage comprises two unitary structures, each structure comprising one of the filaments bonded to a medium adapted to be bonded in turn to the surface of the structure under test and provided with lead wire means for making external connections to it.

9. A temperature compensated resistive type strain gage adapted to be bonded to a member under test comprising, in combination, strain responsive and temperature compensating filaments, the materials of the filaments having thermal coefficients of resistance of the same algebraic sign but of different values, and means for adjusting the temperature compensating effect of the gage.

10. A temperature compensating resistive type strain gage adapted to be bonded to a member under test comprising, in combination, strain responsive and temperature compensating filaments, the materials of the filaments having thermal coefficients of resistance of the same algebraic sign but of different values, a measuring bridge, one arm of which contains the strain responsive filament and the adjacent arm of which contains the temperature compensating filament, a resistance element in said latter arm in series with said temperature compensating filament, and means for varying the resistive effect of said resistance element so as to adjust the temperature compensating action of the compensating filament.

11. The combination set forth in claim 10 further characterized in that the means by varying the resistive effect of said resistance element includes a shunt resistance connected in parallel across said temperature compensating filament.

12. The combination set forth in claim 10 further characterized in that a plurality of strain responsive filaments are arranged in a group and a single temperature compensating filament is selectively connectable to the individual strain responsive filaments so that temperature compensated strain determinations may be obtained for the individual strain responsive filaments.

13. A temperature compensated strain gage of the electrical resistance type adapted to be attached to a member under test, comprising an electrically conductive filament resistively responsive to strain applied to it, a second electrically conductive filament, both of said filaments being subject to substantially the same temperature and the materials of the two filaments having thermal coefficients of resistance of the same algebraic sign but differing in magnitude, and a bridge circuit having adjacent arms the total resistance of one being substantially equal to that of the other and said filaments being respectively disposed in said arms, the resistances of said filaments being substantially inversely proportional to their thermal coefficients of resistance, whereby the unbalance of said bridge circuit is responsive to strain applied to the gage substantially independent of its temperature variations.

14. As an article of manufacture, a temperature compensated strain gage of the electrical resistance type adapted to be attached to a member under test comprising, strain responsive and temperature compensating filaments, the materials of the two filaments having different coefficients of resistance but of the same algebraic sign.

ARTHUR C. RUGE.

No references cited.